(12) United States Patent
Nakai

(10) Patent No.: US 6,927,915 B2
(45) Date of Patent: Aug. 9, 2005

(54) DIFFRACTIVE OPTICAL ELEMENT, AND OPTICAL SYSTEM AND OPTICAL APPARATUS PROVIDED WITH THE SAME

(75) Inventor: Takehiko Nakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/459,902

(22) Filed: Jun. 12, 2003

(65) Prior Publication Data

US 2003/0231395 A1 Dec. 18, 2003

(30) Foreign Application Priority Data

Jun. 17, 2002 (JP) ......................................... 2002-176143

(51) Int. Cl.$^7$ ................................................. G02B 5/18
(52) U.S. Cl. ...................................... 359/569; 359/575
(58) Field of Search ................................ 359/565, 566, 359/569, 575, 576

(56) References Cited

U.S. PATENT DOCUMENTS

| | | | | |
|---|---|---|---|---|
| 3,484,153 | A | * 12/1969 | Jackson et al. | ................. 430/9 |
| 5,113,067 | A | 5/1992 | Nakai et al. | ............. 250/208.1 |
| 5,225,930 | A | * 7/1993 | Land et al. | ................. 359/578 |
| 5,245,471 | A | * 9/1993 | Iwatsuka et al. | ............ 359/494 |
| 5,742,433 | A | * 4/1998 | Shiono et al. | .............. 359/575 |
| 6,191,890 | B1 | * 2/2001 | Baets et al. | ................. 359/572 |
| 6,490,393 | B1 | * 12/2002 | Zhou | ........................... 385/37 |
| 2004/0021945 | A1 | * 2/2004 | Tompkin et al. | ............ 359/566 |

FOREIGN PATENT DOCUMENTS

JP 5-46139 7/1993

OTHER PUBLICATIONS

Kathman, et al, "Binary optics in lens design", International Lens Design Conference; Jun. 11–14, 1990, vol. 1354, pp. 297–309.
A. P. Wood, "Using hybrid refractive–diffractive elements in infrared Petrval objectives"; International Lens Design Conference; Jun. 11–14, 1990, vol. 1354, pp. 316–322.
M. W. Farn, "Binary gratings with increased efficiency", Applied Optics, vol. 31, No. 22, Aug. 1, 1992, p. 4453–4458.

* cited by examiner

Primary Examiner—Mark A. Robinson
Assistant Examiner—Alessandro Amari
(74) Attorney, Agent, or Firm—Morgan & Finnegan LLP

(57) ABSTRACT

A diffractive optical element of the blazed-binary grating type is disclosed, with which a high diffraction efficiency can be achieved over substantially the entire used wavelength region. The diffractive optical element has a periodic structure taking a grating unit including a plurality of grating portions with different grating width and grating interval as one period. The diffraction element further includes a plurality of first grating portions made of a first material and a plurality of second grating portions made of a second material having a different refractive index than the first material that are arranged between the first grating portion.

15 Claims, 14 Drawing Sheets

DIFFRACTIVE OPTICAL ELEMENT, AND OPTICAL SYSTEM AND OPTICAL APPARATUS PROVIDED WITH THE SAME

BACKGROUND OF THE INVENTION

1. Field of the Invention

The present invention relates to diffractive optical elements, and more particularly to diffractive optical elements having a blazed-binary grating, as well as optical systems and optical apparatuses provided with the same.

2. Description of the Related Art

Conventional diffractive optical elements serving as diffraction lenses with the purpose of reducing chromatic aberration are disclosed in SPIE Vol. 1354 International Lens Design Conference (1990), for example.

Color separation gratings utilizing the fact that the diffraction angle differs depending on the wavelength of the incident light in order to perform color separation are disclosed for example in Japanese Patent Publication No. 1993-46139 (corresponding to U.S. Pat. No. 5,113,067). Furthermore, recently, a diffractive optical element known as SWS (sub-wavelength structure) grating, whose grating period has a microscopic periodic structure that is smaller than the used wavelength, has been disclosed in "Kougaku" [Optics], vol. 1 of 27 in series (1998), pp. 12 to 17.

Due to its grating structure, this SWS grating is used for elements with various functions, such as birefringent wavelength plates, anti-reflection structures and polarization beam splitters. Moreover, it has been reported that for these functions, there are only small performance variations due to changes of the angle of incidence.

Among SWS gratings, Applied Optics, Vol. 31, No. 22, p. 4453 (1992) discloses the structure shown in FIG. 10 as a diffractive optical element known as a blazed binary grating.

In the diffractive optical element of FIG. 10, a blazed-binary grating 13 is formed on a substrate 12. The blazed-binary grating 13 is a SWS grating in which one-dimensional rectangular gratings are fabricated with a period p1 that is smaller than the wavelength of the incident light (used wavelength). The SWS rectangular grating is formed at the border between a region 14 of a first material and a region 15 of a second material. When the grating width of the first material is wi (i=1 ... s), then the proportion fi (=wi/p1, i=1 ... s) that the first material occupies within the grating pitch repeatedly changes gradually from f1 to fs within a period Pt that is larger than the wavelength of the incident light.

With this structure, the effective refractive index changes gradually even though the grating height (depth of the grating grooves) is constant, and as a result, it is possible to attain a performance that is substantially the same as that of a blazed diffraction grating with a constant refractive index in which the height of the grating portions 10 changes gradually, as shown in FIG. 14.

FIG. 11 shows the diffraction efficiency as a function of the wavelength of polarized waves in which the electric field component is parallel to the blazed binary grating grooves (referred to as "TE polarized light" in the following).

Moreover, recently, the assignee of this application has proposed, as the structure of a diffractive optical element, the diffractive optical element shown in FIG. 12. In this diffractive optical element, the grating thickness (grating height) of two grating portions 10' and 11' made of different materials is changed gradually (monotonously), and by stacking the two gratings 10' and 11' on top of one another in the thickness (height) direction, a high diffraction efficiency in the entire visible wavelength region can be achieved, as shown in FIG. 13.

In these conventional examples, the structure of blazed-binary gratings has come to a stand-still at obtaining the same performance as the blazed-binary grating shown in FIG. 14, and there are limits to using them in the entire visible wavelength region.

SUMMARY OF THE INVENTION

It is an object of the present invention to present a diffractive optical element having a blazed-binary grating with which a high diffraction efficiency can be achieved over substantially the entire used wavelength region.

A diffractive optical element according to the present invention has a periodic structure taking a grating unit including a plurality of grating portions with different grating width and grating interval as one period. The diffraction element further includes a plurality of first grating portions made of a first material and a plurality of second grating portions made of a second material having a different refractive index than the first material that are arranged between the first grating portions.

These and further objects and features of the invention will become apparent from the following detailed description of preferred embodiments thereof taken in conjunction with the accompanying drawings.

DETAILED DESCRIPTION OF THE PREFERRED EMBODIMENTS

The following is a description of embodiments of the present invention, with reference to the accompanying drawings.

Embodiment 1

Figure 1:
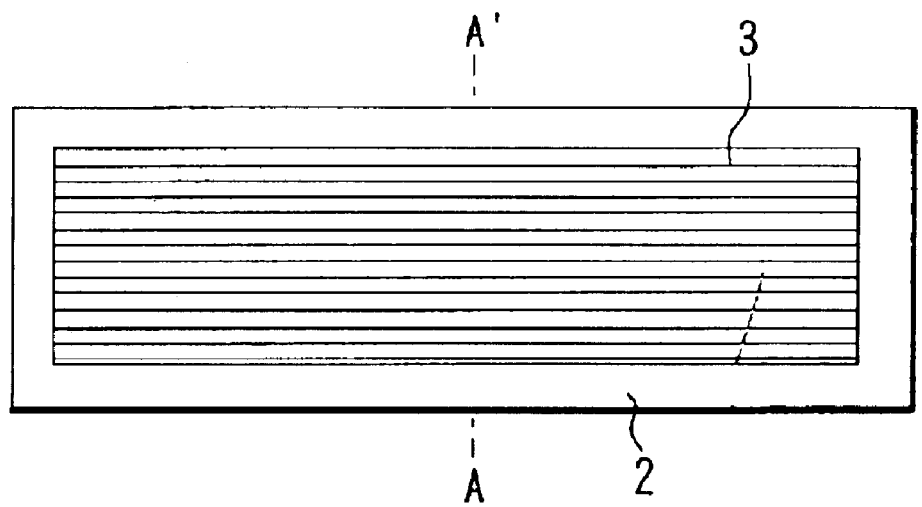
FIG. 1(A) is a front view of a diffractive optical element according to Embodiment 1 of the present invention.
FIG. 1(B) is a lateral view of that diffractive optical element.
Figure 1:
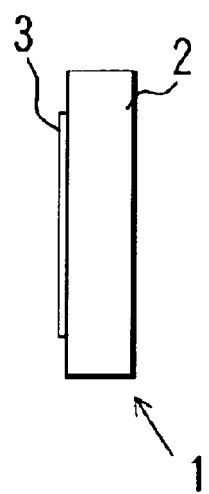
Figure 2:
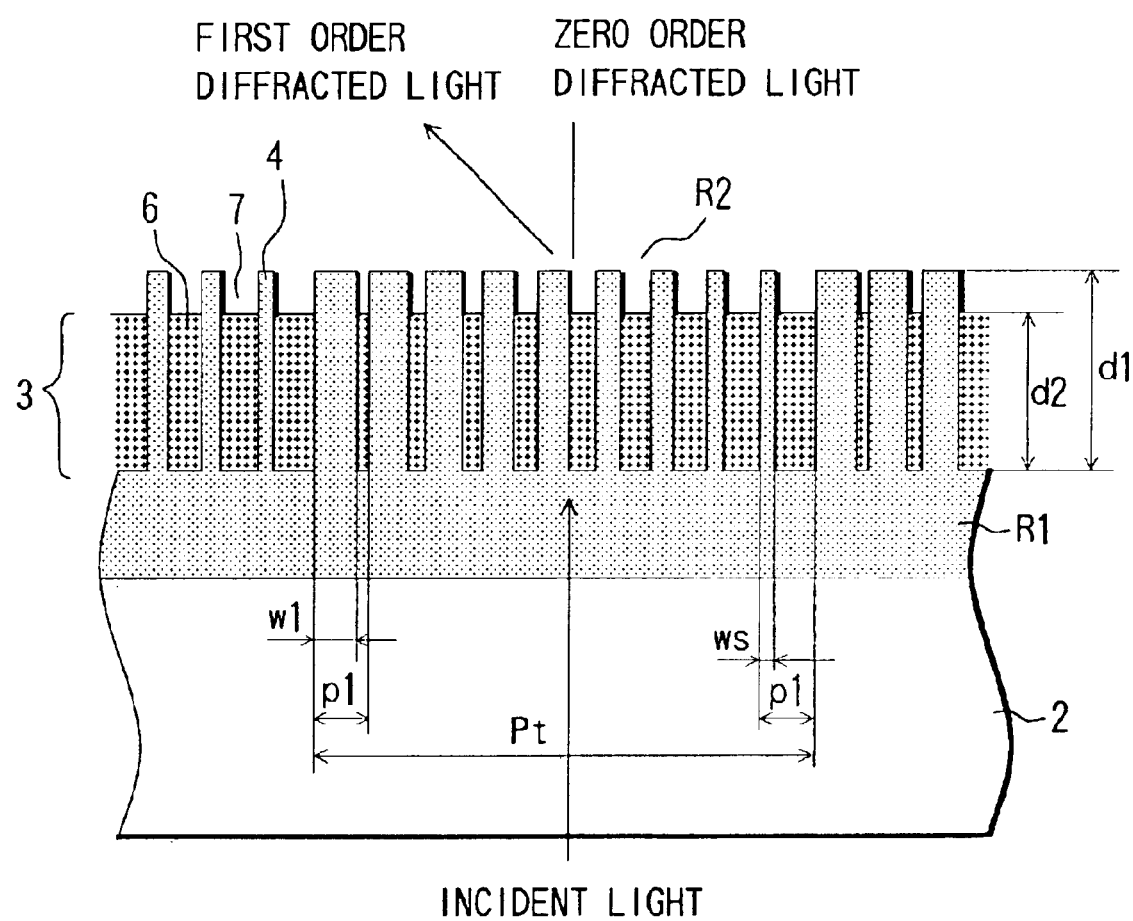
FIG. 2 is a cross-sectional view (along line A–A' in FIG. 1) of the diffractive optical element of Embodiment 1.

FIGS. 1(A), 1(B) and 2 show the structure of a diffractive optical element according to Embodiment 1 of the present invention. The diffractive optical element 1 is configured by providing a transparent blazed-binary diffraction grating 3 on a transparent substrate 2.

The blazed-binary diffraction grating 3 has a periodic structure in which one-dimensional comb-tooth-shaped grating units are formed in repetition, and with respect to the direction A–A' in FIG. 1(A), it has a grating unit period Pt, which is larger than the wavelength of the incident (used) light (used wavelength). Moreover, light that is incident on the diffractive optical element is diffracted only in a specific direction, which depends on the grating unit period Pt and the design order m.

In FIG. 2, the blazed-binary diffraction grating 3 that is provided on the substrate 2 is configured to have a plurality of first grating portions 4 that are made of a first material having a refractive index that is not substantially one and have a constant grating height (grating groove depth) at a pitch p1 that is smaller than the used wavelength, and second grating portions 6 that are provided in the grooves between the first grating portions 4 and that are made of a second material having a refractive index that is not substantially one and is different from that of the first material. In one grating unit, a plurality of the first and second grating portions 4 and 6, each of which is formed in a rectangular shape are formed. As described above, within the present specification, the minute structure made of a material (solid, liquid) other than a material such as air and such, which has a substantial refractive index of 1, is called a grating portion.

Within one grating unit period Pt, the grating width (the width of a grating portion) and the grating interval (the interval between the grating portions adjacent to each other) of the first grating portions 4 increases or decreases gradually (monotonously). That is to say, the width w that is occupied by the first material within the grating pitch p1 changes gradually from w1 to ws. A SWS diffraction grating is configured through a periodic structure taking such a grating unit as one period (grating unit period Pt, which is larger than the used wavelength).

The first grating portions 4 are formed integrally with a base portion that constitutes a first region R1 made of the same first material as the first gratings 4 and in contact with the blazed-binary diffraction grating 3 on the side on which light is incident.

The second grating portions 6 are formed in portions inside the grooves between the first grating portions 4 that contact the base portion, and have a grating height d2 that is lower than the height of the first grating portions 4.

The side on which the light emerges from the blazed-binary diffraction grating 3 is in contact with a second region R2 made of air. That is to say, the blazed-binary diffraction grating 3 is formed on the border between the first region R1 and the second region R2.

The portions of the grooves between the first grating portions 4, where the second grating portions 6 are not provided in the grating height direction are also filled with air (third material), like the second region R2.

When light is incident from the side of the substrate 2 into the diffractive optical element with this structure, then the light that has passed via the first region R1 through the blazed-binary diffraction grating 3 is diffracted in a diffraction direction that depends on the grating unit period Pt, in the direction of only a specific diffraction order (first order in FIG. 2), and is propagated through the second region R2.

The following is an explanation of the structure and the optical effect of the diffractive optical element 1, using concrete numerical values. In order to provide a grating structure having a microscopic grating pitch with the properties of a SWS, diffraction grating, the grating pitch needs to be sufficiently small compared to the used wavelength. More specifically, of the grating pitches p1 that satisfy the grating equation (1), a grating pitch p1 should be selected at which the equation becomes true only for zero-th order diffracted light as propagated light.

$$n3(\lambda)\sin\theta 3 - n1(\lambda)\sin\theta 1 = m\lambda/p1 \quad (1)$$

In Equation (1):

$n1(\lambda)$ and $n3(\lambda)$ are, respectively, refractive indices of the first material on the incident side and the third material on the emergent side;

$\theta 1$ is an incident angle of incident light;

$\theta 3$ is an emergent angle (diffraction angle) of light;

m is a diffraction order;

$\lambda$ is a used wavelength; and p1 is a grating pitch.

A simple numerical example shall supplement these explanations. The used wavelength $\lambda$ is taken to be 400 nm, the refractive index of the first material on the incident side is $$n1(\lambda)=1.5,$$

and the refractive index of the third material on the emergent side is $$n3(\lambda)=1.0.$$

Now, when light from a direction perpendicular to the grating period direction is incident at an incident angle $\theta 1=5°$, the diffraction order m is set to 1 and the emergent angle $\theta 3$ is set to $-90°$, the grating pitch p1 according to Equation (1) becomes 0.35 μm.

Consequently, when the grating pitch p1 is 0.35 μm or smaller, there is no solution to Equation (1), so that there is no light that is diffracted by the microscopic periodic structure. Therefore, the only light that is propagated will be the zero-th order diffracted light with respect to the microscopic periodic structure. The equation for the diffraction of zero-th order diffracted light corresponds to the case that m=0 in Equation (1), and is equivalent to Snell's law of refraction.

Adopting these conditions, the microscopic periodic structure has the structural birefringence that is the unique nature of SWS diffraction gratings. Furthermore, with these conditions, there is no diffraction at the SWS diffraction grating, so that it becomes unnecessary to consider diffraction at the microscopic periodic structure when contemplating diffraction at the blazed-binary diffraction grating.

As explained above, in the blazed-binary diffraction optical grating 1 having this microscopic periodic structure, the grating pitch needs to be decided such that the period (grating pitch) of the microscopic periodic structure satisfies the above-described conditions over the entire region of used wavelengths and over the range of used incident angles.

Figure 3:
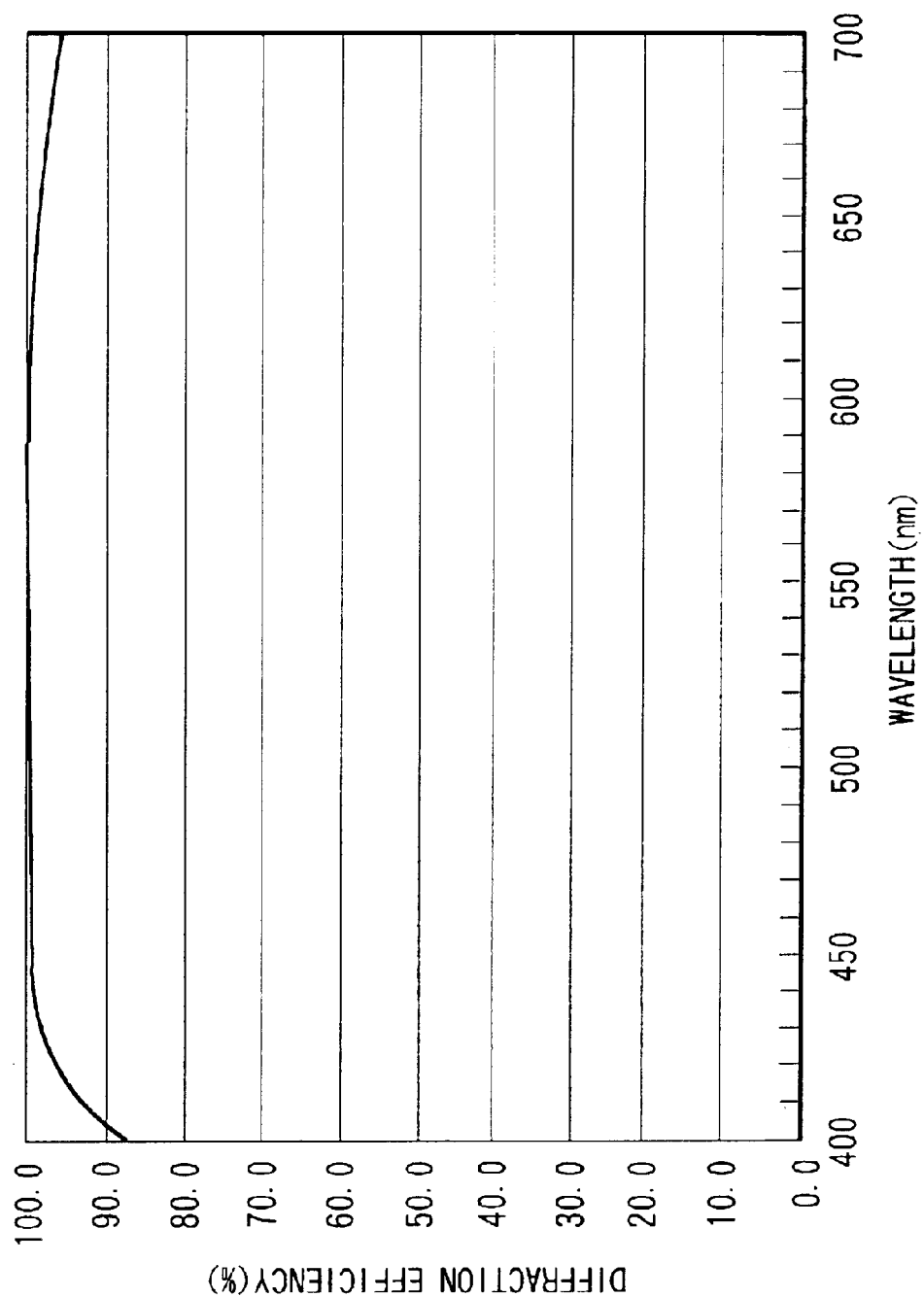
FIG. 3 is a graph illustrating the diffraction efficiency for TE-polarized light of the diffractive optical element of Embodiment 1.

FIG. 3 illustrates the diffraction efficiency of the diffractive optical element 1. In this figure, the horizontal axis denotes the wavelength of incident light, whereas the vertical axis denotes the diffraction efficiency. Here, the first material constituting the first grating portions 4 and the first region R1 is a UV-light curing resin (with nd=1.524, vd=50.8), second material constituting the second grating portions 6 is a UV-light curing resin (with nd=1.6363, vd=22.8), and the third material is air.

The height d1 of the first grating portions 4 is set to 10.71 μm, and the height d2 of the second grating portions 6 is set to 7.88 μm. Moreover, the grating pitch p1 of the first grating portions 4 is set to 0.2 μm, and the grating width w of the first grating portions 4 is changed gradually from 0.2 μm to 0 μm.

As can be seen in FIG. 3, with the diffractive optical element 1 of this embodiment, an optimum diffraction efficiency can be obtained across substantially the entire region of used wavelengths for the TE polarization component of the incident light. Furthermore, it can be seen that with the diffractive optical element 1 of this embodiment, a diffraction efficiency is attained that is favorable across the entire visible wavelength region, like the high-efficiency diffractive optical element shown in FIG. 12.

The following is an explanation of the grating width. In the diffractive optical element (SWS diffractive optical element) 1 of this embodiment as shown in FIG. 2, nine first grating portions 4 are formed in repetition with a period Pt as one grating unit, thus realizing a blazed-binary diffraction grating. The procedure for determining the grating width of the first grating portions 4 such that the diffraction optical grating 1 with this structure has a performance that is equivalent to the 9-step binary type diffractive optical element shown in FIG. 9 is explained below.

Figure 9:
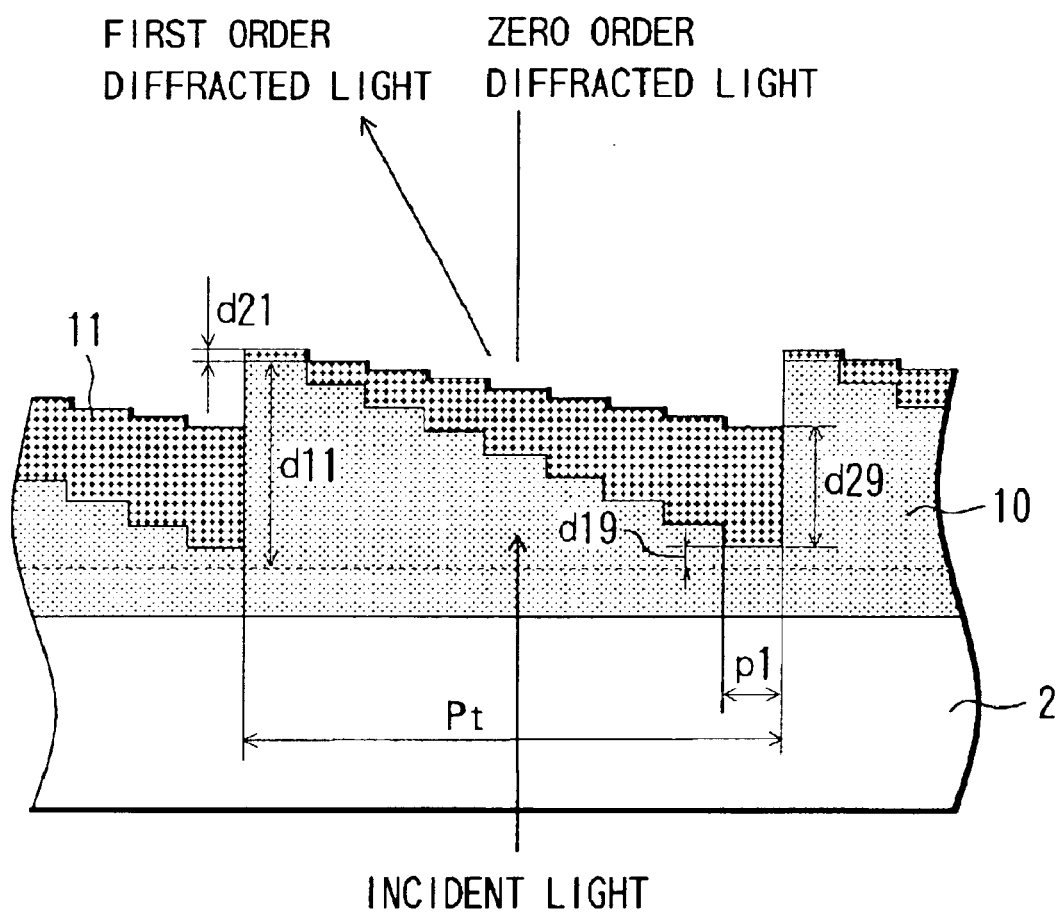
FIG. 9 is a cross-sectional view of a conventional binary-type diffractive optical element.

The following-example is for the left-most step of a nine-step grating unit in FIG. 9. In the diffractive optical element, a first grating portion having nine steps in one period and a second grating portion 11 having nine steps in one period are layered with each other in the grating height direction. The height $d1i$ ($i=1\sim9$) of the first grating portion 10 gradually decreases from the left side to the right side in the figure, and the height $d2i$ ($i=1\sim9$) of the second grating portion 11 gradually increases in the same direction.

Figure 12:
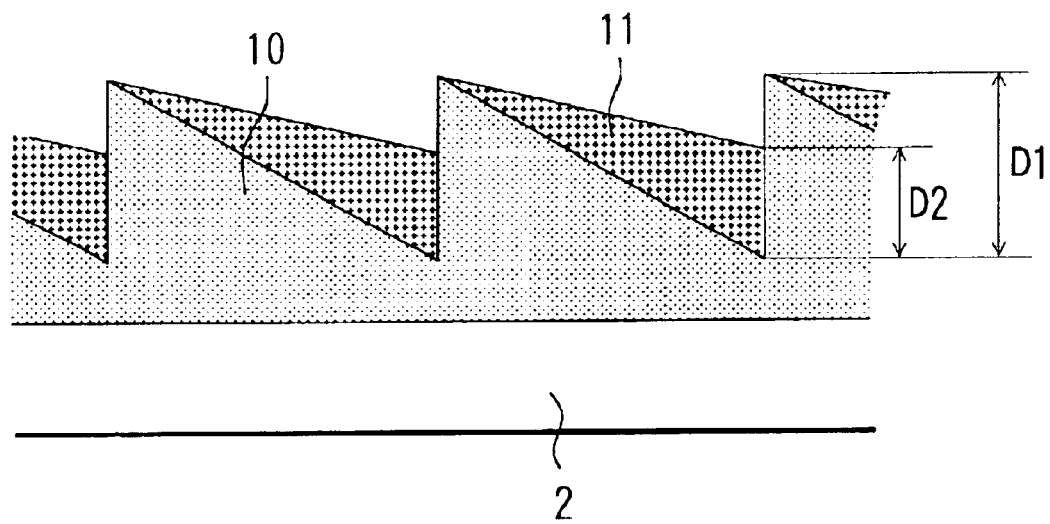
FIG. 12 is a cross-sectional view of a conventional blazed high-efficiency diffractive optical element.
Figure 13:
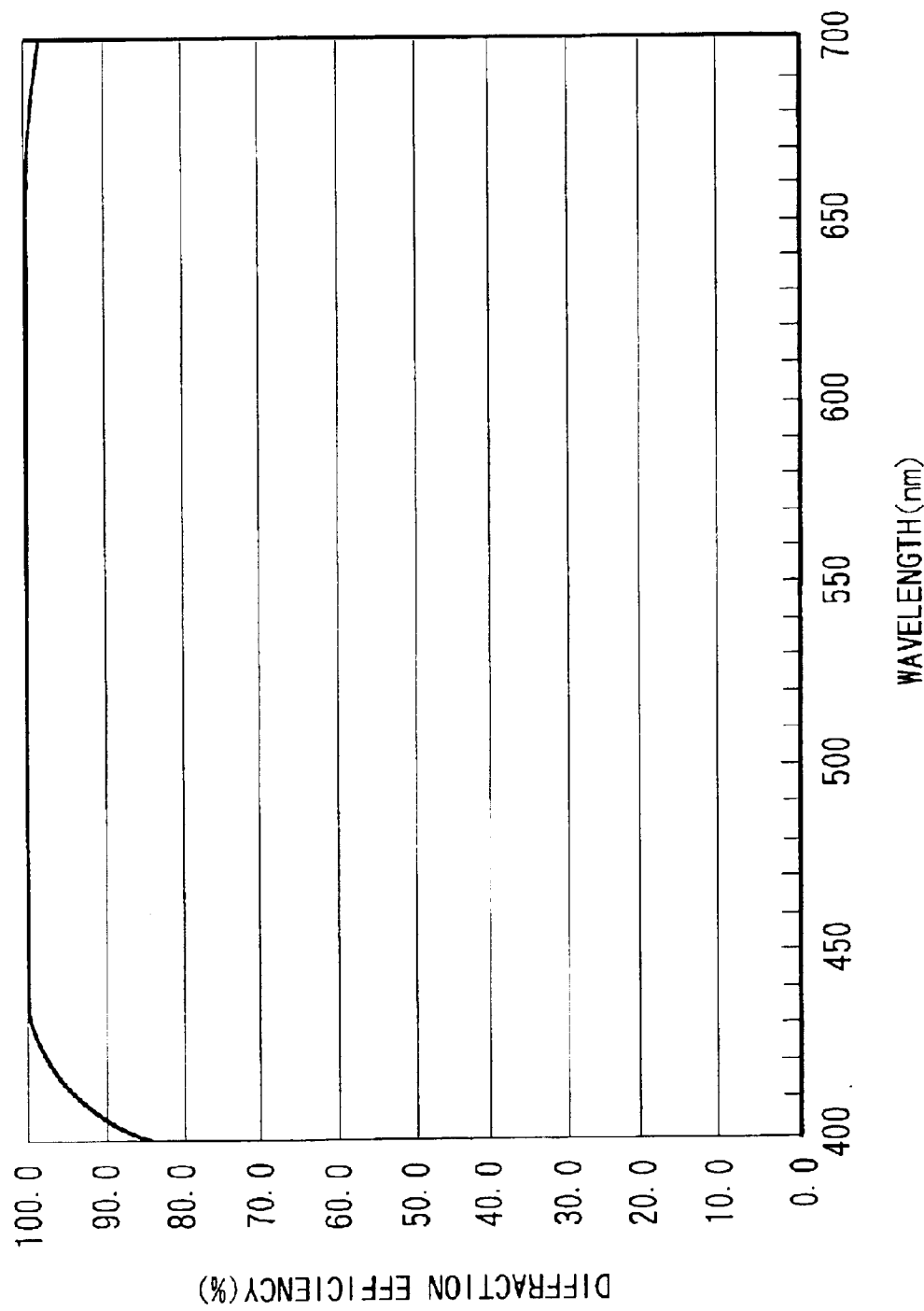
FIG. 13 is a graph illustrating the diffraction efficiency of a conventional blazed high-efficiency diffractive optical element.
Figure 14:
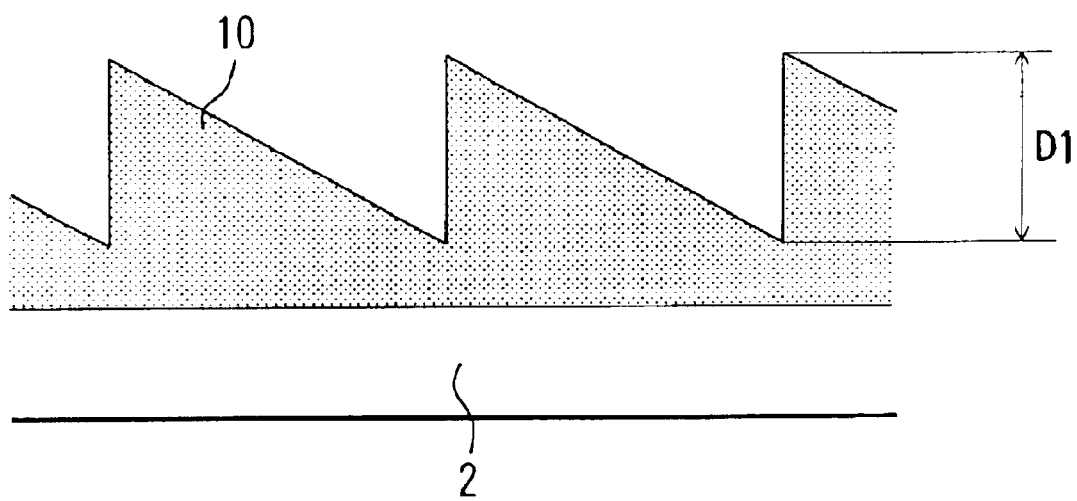
FIG. 14 is a cross-sectional view of a conventional blazed diffractive optical element.

In the diffractive optical element shown in FIG. 12, when the heights of the first and the second grating portions 10' and 11' are D1 and D2, then the height of the left-most step of the second grating portion 10 in FIG. 9 is d11=9/9D1, and the height of the left-most step of the second grating portion 11 in FIG. 9 is d21=1/9D2.

The grating heights of each right-most step of the first and second grating portion 10 and 11, respectively, are:

$$d1a=1/9D1$$

$$d2a=9/9D2$$

Figure 10:
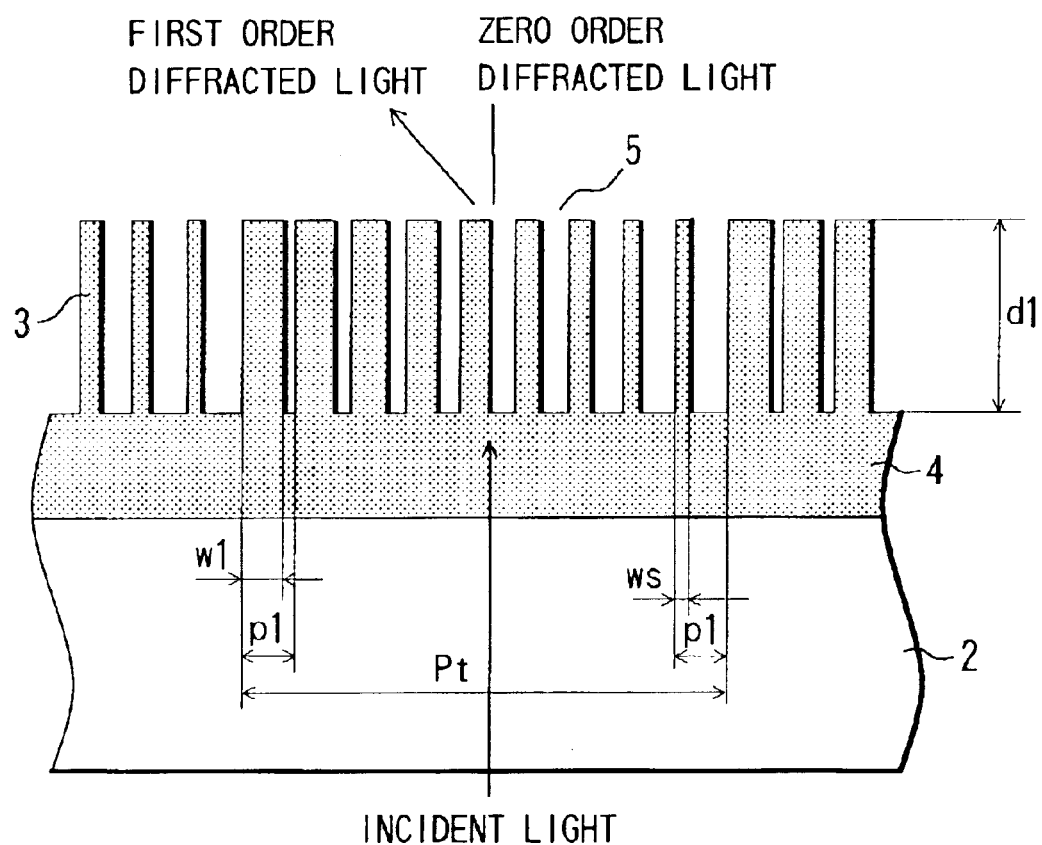
FIG. 10 is a cross-sectional view of a conventional blazed-binary diffractive optical element.
Figure 11:
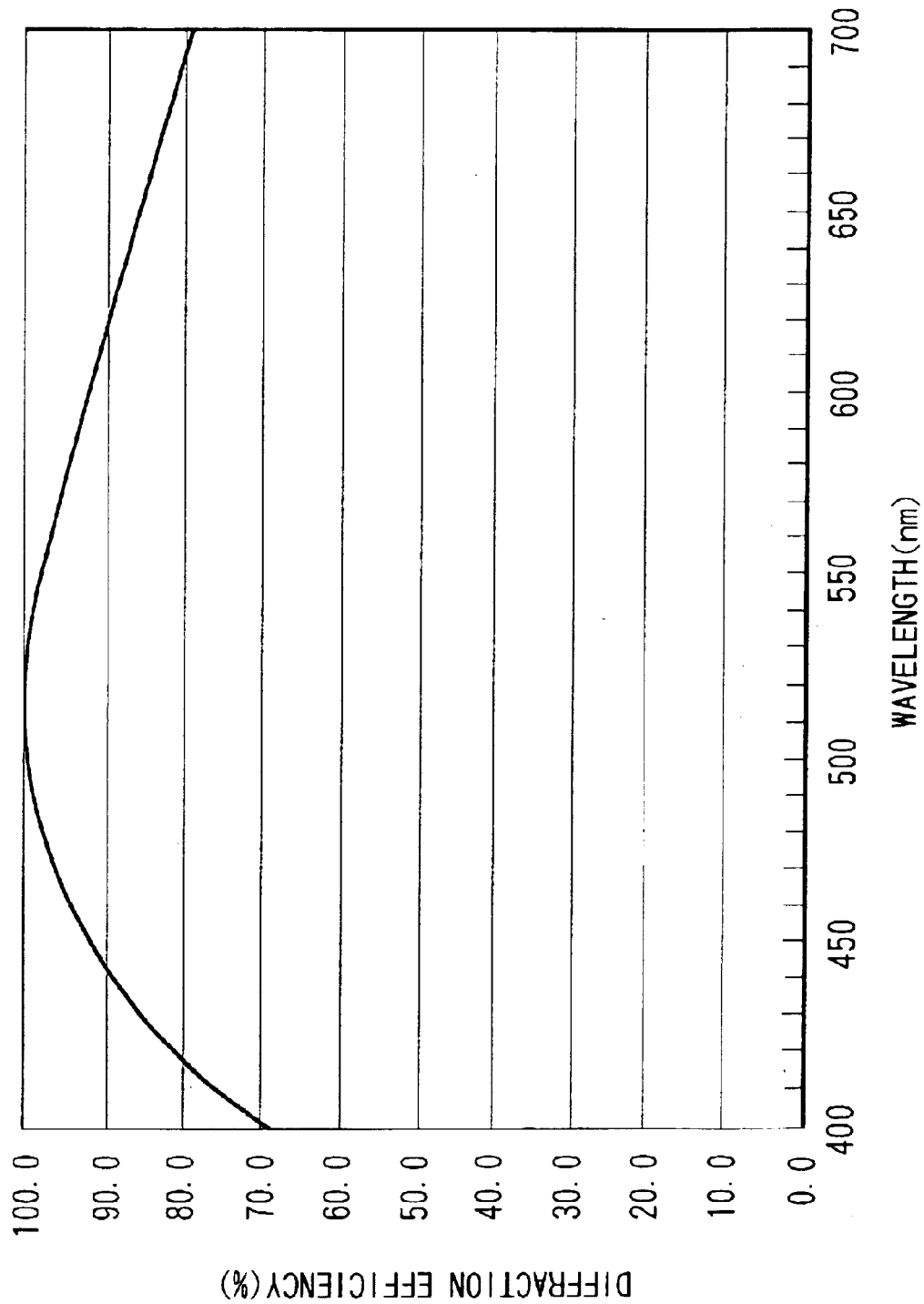
FIG. 11 is a graph illustrating the diffraction efficiency for TE-polarized light of the conventional blazed-binary diffractive optical element.

Furthermore, the refractive index of the material constituting the grating portions with respect to the wavelength λ is set to n1(λ) for the first grating portion (first material) and is set to n2(λ) for the second grating portion (second material). One border is a border between the second grating portion 11 and air (third material). The optical path length Lbi(λ) of the i-th step in this case is $$Lbi(\lambda)=\{n1(\lambda)-1\}\cdot d1i+\{n2(\lambda)-1\}\cdot d2i \qquad (2)$$

where, i=1~s, and s is 9 in FIG. 10.

On the other hand, the optical path length Li(λ) of the i-th grating portion in one of the grating units of the diffractive optical element 1 of the present embodiment can be determined to be $$Lai(\lambda)=\{n1ieff(\lambda)-1\}\cdot(d1-d2)+\{n2ieff(\lambda)-1\}\cdot d2 \qquad (3)$$

where, i=1~s, and s is 9 in FIG. 10.

Herein, the effective refractive index n1ieff(λ) of a first grating unit constituted of the first grating portions (the first material) is $$n1ieff(\lambda)=[fi\cdot\{n1(\lambda)\}^2+(1-fi)\cdot\{n3(\lambda)\}^2]^{1/2} \qquad (4)$$

$$(i=1\sim s), \text{ and} \qquad (5)$$

the effective refractive index n2ieff(λ) a second grating unit constituted of the second grating portions (the second material) is $$n2ieff(\lambda)=[fi\cdot\{n1(\lambda)\}^2+(1-fi)\cdot\{n2(\lambda)\}^2]^{1/2} \qquad (6)$$

$$(i=1\sim s), \text{ and} \qquad (7)$$

since the third material in this embodiment is air, $$n3(\lambda)=1$$

Furthermore, $$fi=wi/p1$$

If the value of fi is determined from the above-noted relations such that $$Lai(\lambda)=Lbi(\lambda) \qquad (6)$$

$$(i=1\sim s)$$

is satisfied, then the i-th step of the 9-step units shown in FIG. 9 can be substituted by the i-th grating portion of the grating unit of the present embodiment.

The grating widths should be determined for each step such that Expression (6) is satisfied.

In this embodiment, the heights d1 and d2 of the gratings 4 and 6 may be $$d1=D1$$

$$d2=D2,$$

but there is no limitation to this, and d1 and d2 may also be determined giving consideration to the grating widths that can be manufactured and the like.

In this embodiment, it is preferable that the number of first grating portions 4 within the grating unit period Pt is determined such that the optical path length difference $$\Delta La_i(\lambda)=La_{i+1}(\lambda)-La_i(\lambda) \text{ (wherein } i=1\sim s-1, \text{ with s being the number of grating portions)}$$

between adjacent first grating portions 4 becomes not greater than ¼ of the used wavelength.

The diffractive optical element 1 of the present embodiment is configured such that a performance that is equivalent to that of the diffractive optical element shown in FIG. 12 is achieved for TE-polarized light. Consequently, the performance for TM-polarized light (polarized wave whose electric field component is perpendicular to the blazed-binary grating) is not regulated in particular.

To address this, d1 and d2 may be selected such that the desired properties are met for TM-polarized light while meeting the afore-mentioned performance for TE-polarized light.

The above-described diffractive optical element 1 of this embodiment is formed on the substrate 2, but it is also possible to use a quartz substrate, and to form the shape of the diffractive optical element directly on the substrate by etching that substrate.

Embodiment 2

Figure 4:
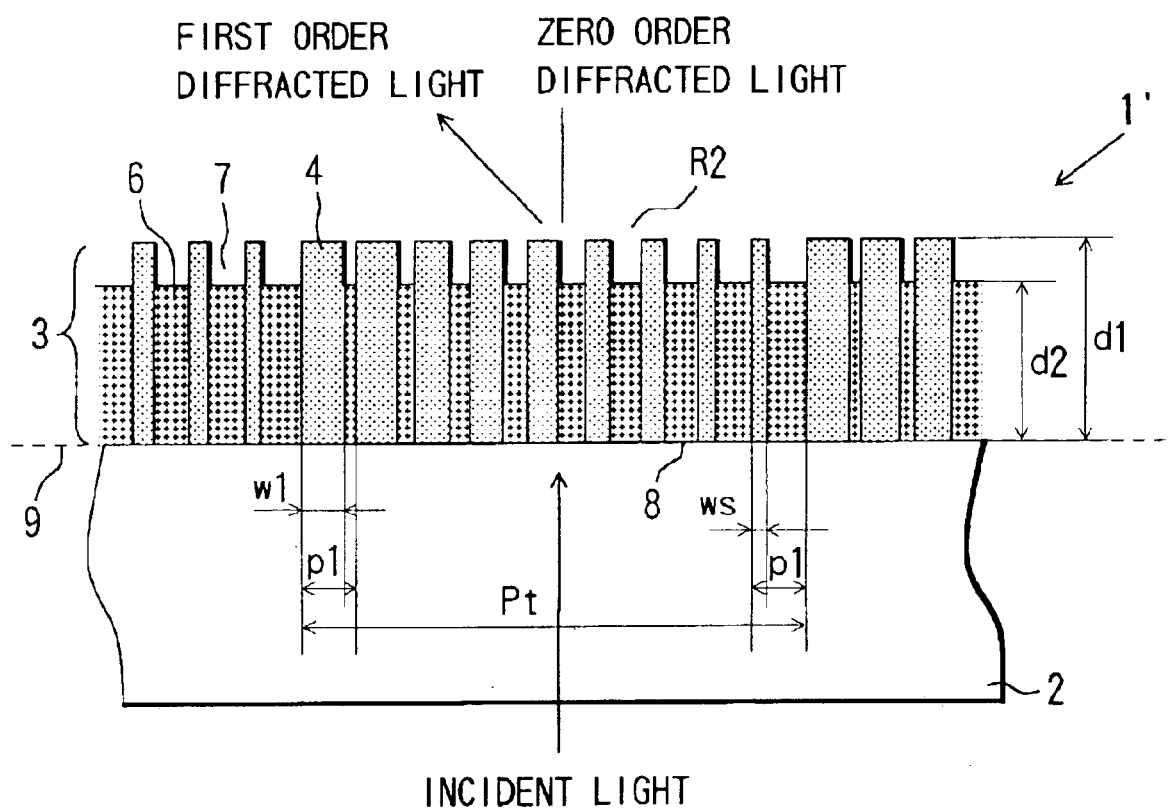
FIG. 4 is a cross-sectional view of a diffractive optical element according to Embodiment 2 of the present invention.

FIG. 4 shows the structure of a diffractive optical element according to Embodiment 2 of the present invention. The diffractive optical element 1' of this embodiment is different from Embodiment 1 in that the blazed-binary diffraction grating 3 is formed in contact with the substrate 2. For this reason, the bottom surface 8 of the grating grooves is the substrate surface. It should be noted that in this embodiment, structural elements that are the same as in Embodiment 1 have been denoted by the same numerals as in Embodiment 1.

With this structure, when the first grating portions 4 are fabricated for example by etching with a material other than a resin, the substrate 2 can serve as an etching stopper layer, and the grating height can be controlled with high precision.

Furthermore, it becomes possible to select the refractive index of the material of the substrate 2 so as to minimize the reflection loss occurring at the border 9 between the grating bottom surface and the substrate surface.

Embodiment 3

Figure 5:
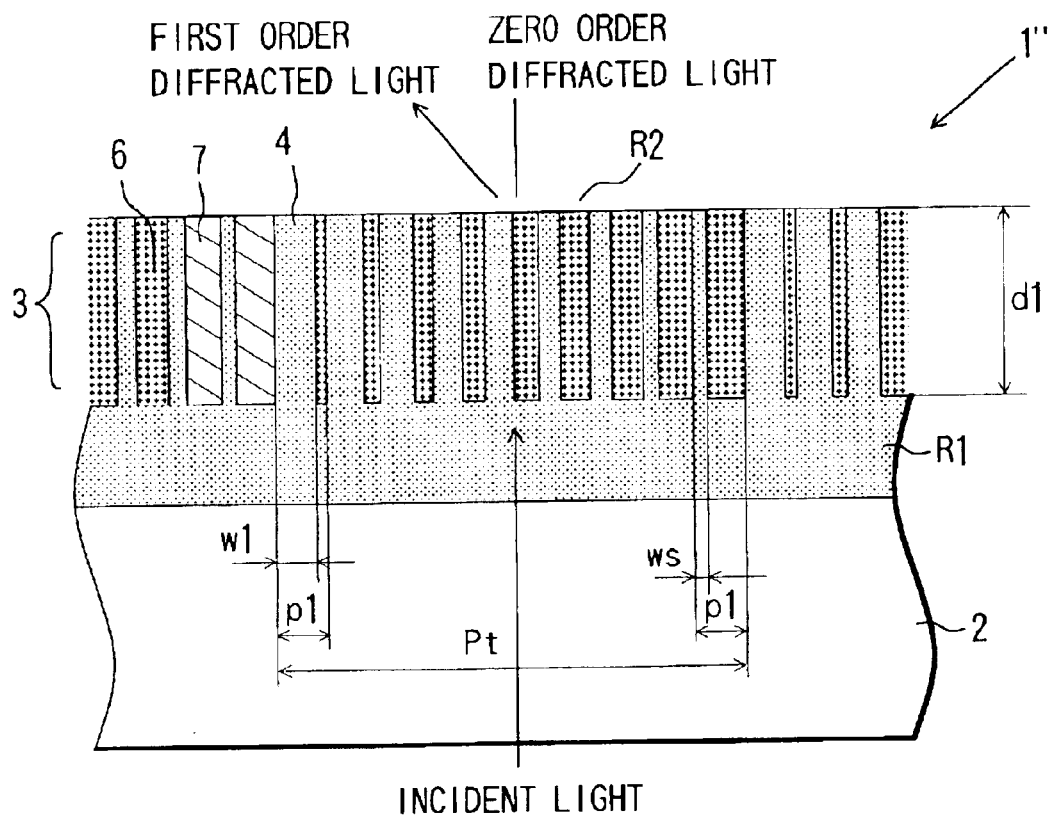
FIG. 5(A) is a cross-sectional view of a diffractive optical element according to Embodiment 3 of the present invention.
FIG. 5(B) is a plan view of that diffractive optical element.
Figure 5:
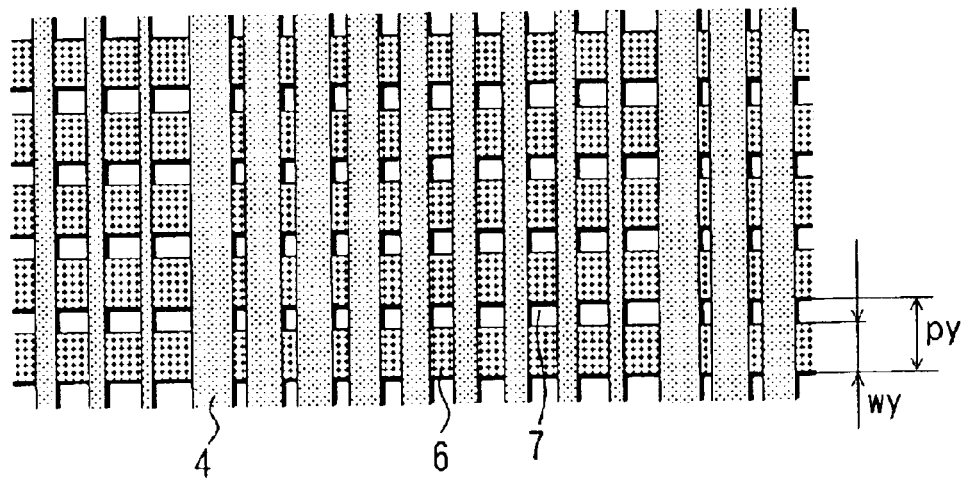

FIG. 5 shows the structure of a diffractive optical element according to Embodiment 3 of the present invention. FIG. 5(A) is a cross-sectional view of the diffractive optical element, and FIG. 5(B) is a plan view of the diffractive optical element. It should be noted that in this embodiment, structural elements that are the same as in Embodiment 1 have been denoted by the same numerals as in Embodiment 1.

In addition to the structure explained in Embodiment 1, the diffractive optical element 1" of this embodiment has a periodic structure, in which the second and the third material are arranged alternately with regard to the direction perpendicular to the period of the blazed-binary diffraction grating 3. Then, by making the repetition period smaller than the used wavelength it is possible to provide the properties of a SWS diffractive optical element.

Moreover, with this structure, setting the height of the first and second gratings 4 and 6 uniformly to d1, the same effect as in Embodiment 1 can be attained. By matching the heights of the two grating portions 4 and 6, the overall diffractive optical element can be made flat, making the fabrication of the grating shape by etching as described above as well as the handling of the element easier.

In this embodiment, the optical path length difference corresponding to Expression (3) is as follows:

$$Lai(\lambda) = \{n1ieff(\lambda) - 1\} \cdot d1 \quad (7)$$

wherein, i=1~s, $$n1ieff(\lambda) = [fi \cdot \{n1(\lambda)\}^2 + (1-fi) \cdot \{n2ieff(\lambda)\}^2]^{1/2}, \text{ and} \quad (8)$$

$$n2ieff(\lambda) = [fy \cdot \{1/n2(\lambda)\}^2 + (1-fy) \cdot \{1/n3(\lambda)\}^2]^{-1/2}. \quad (9)$$

Herein, fy=width wy of each second grating portion 6/grating pitch py of the second grating portions 6.

Embodiment 4

Figure 6:
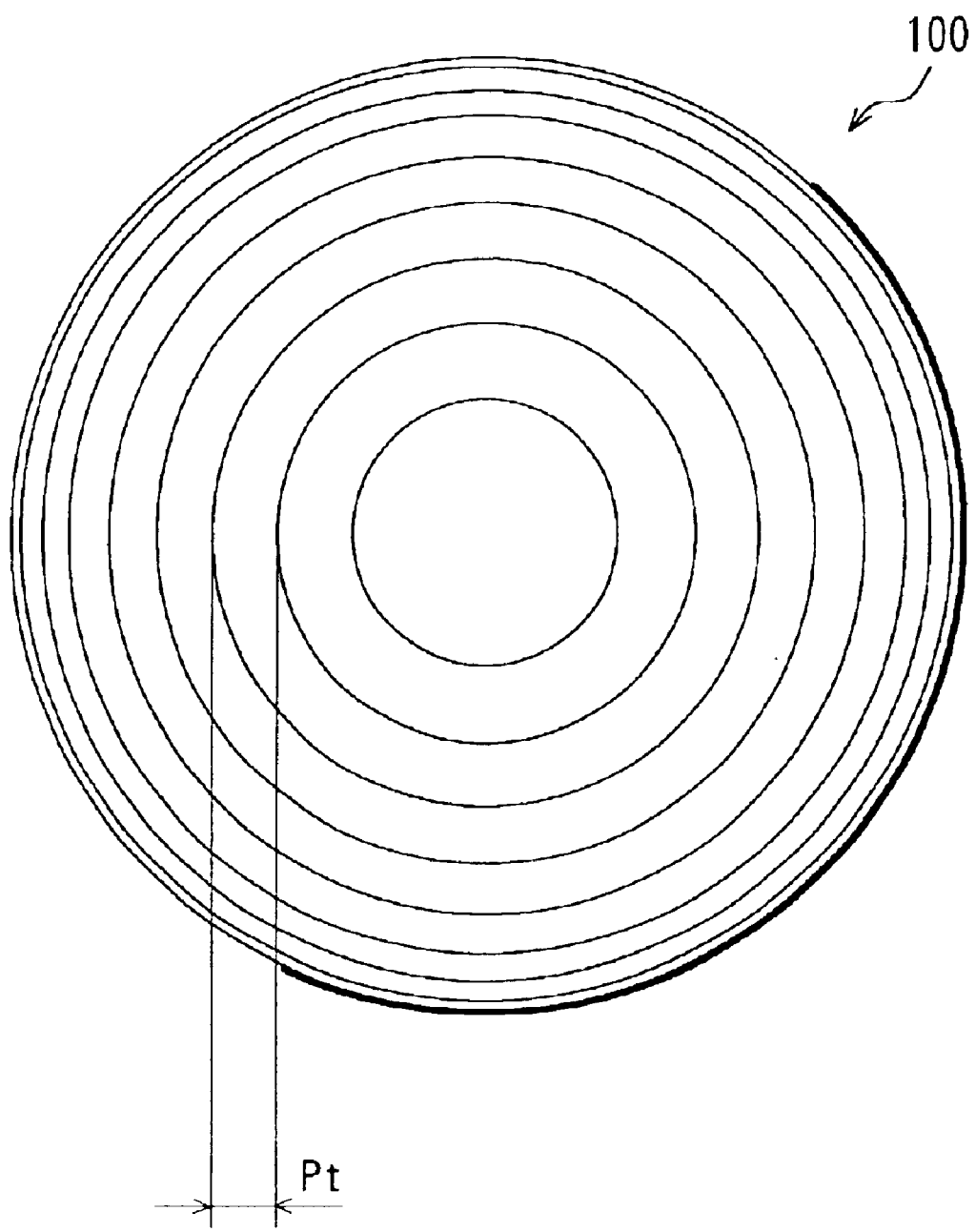
FIG. 6 is a front view of a diffractive optical element according to Embodiment 4.

FIG. 6 shows the structure of a diffractive optical element according to Embodiment 4 of the present invention. The structure of this diffractive optical element 100 is similar to that in Embodiments 1 to 3, but in this embodiment, the grating portions are arranged in concentric circles. In this figure, only the border of one grating unit pt of the Embodiments 1 to 3 is shown as a solid line, and the border lines of the microscopic periodic structures (each grating portions) within one grating unit pt have been omitted.

By gradually changing the grating unit period Pt radially in this element, it is possible to use the blazed-binary diffractive optical element as a lens.

Here, the pitch p1 within one period may be changed in accordance with changing of the grating unit period Pt. Alternatively, in a grating unit with a large grating unit period Pt, the number rn of grating portions within one grating unit period may be made larger than in a grating unit with a small grating unit period Pt. What is important is in either case that the grating pitch p1 is set to a pitch that is smaller than the used wavelength, so that a SWS structure is attained.

Embodiment 5

Figure 7:
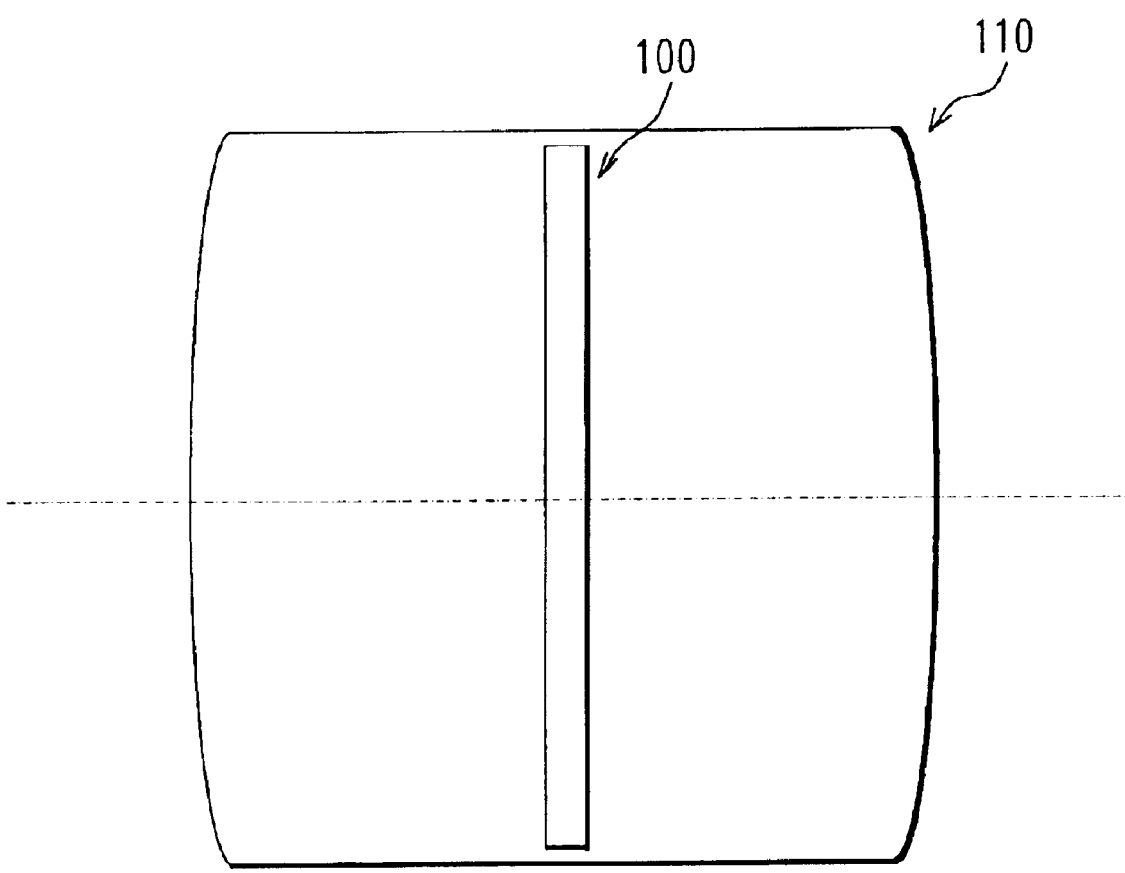
FIG. 7 is a cross-sectional view of an optical system using the diffractive optical element of Embodiment 4.

FIG. 7 shows an optical system according to Embodiment 5 of the present invention, having a diffractive optical element 100 as explained in Embodiment 4. This optical system can be used as an optical system of a camera as described below, or various kinds of other optical apparatuses.

As explained for Embodiments 1 to 3, the diffractive optical element 100 has a diffraction efficiency of diffracted light of the design order that is improved over the entire region of used wavelengths, so that a favorable optical performance can be achieved in an optical system 110 using white light.

Embodiment 6

Figure 8:
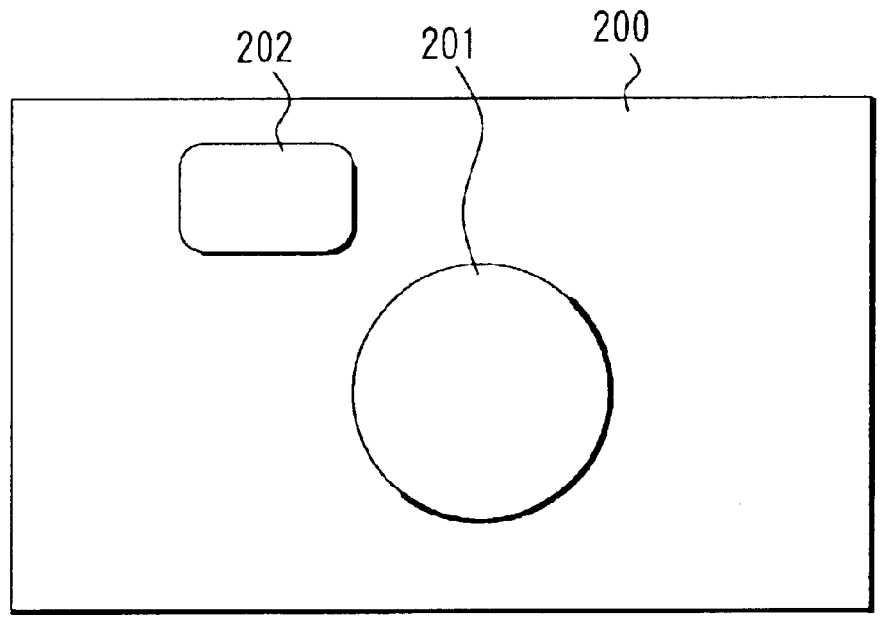
FIG. 8(A) is a front view of a camera according to Embodiment 5 of the present invention.
FIG. 8(B) is a lateral sectional view of that camera.
Figure 8:
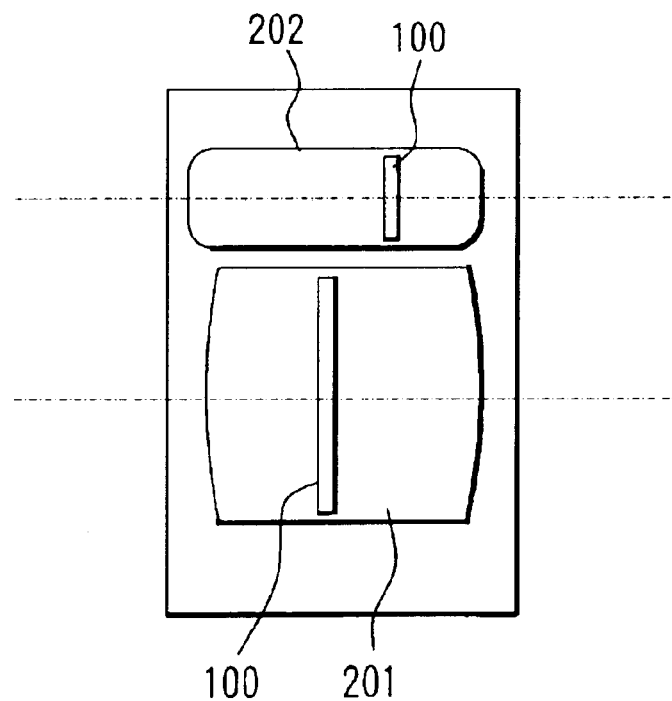

FIGS. 8(A) and 8(B) are respectively a front view and a lateral sectional view of a camera using the optical system 110 shown in FIG. 7 as an image-taking optical system 201 and a finder optical system 202.

In the image-taking optical system 201 and the finder optical system 202, the diffractive optical element 100 may be arranged at any suitable position.

Thus, it is possible to improve the optical performance of the optical system by using the diffractive optical element described in the above embodiments in the optical system of an optical apparatus such as a camera or the like.

As explained above, with the above embodiments, diffractive optical elements can be achieved that combine the features that a high diffraction efficiency can be attained in substantially the entire region of used wavelengths (e.g. visible wavelengths), that the performance changes with regard to changes in the angle of incidence, which are a feature SWS gratings, are small, that the grating height, which is a feature of blazed-binary grating structures, is constant, that is to say, the overall element is substantially flat, and that manufacturing and handling are easy.

Furthermore, if the height of the seconds grating is made lower than the height of the first grating, and the heights of the first and the second gratings are respectively constant, then it is possible to fill the portions between the first grating portions where the second grating is not formed in the grating height direction with a third material (such as air) whose refractive index is different from that of the first and the second material.

Moreover, if the first grating portions are formed on a base portion formed by a first material, and if the refractive index of the second material is closer to the refractive index of the first material than that of the third material, then it is possible to provide the second grating portions in the regions contacting the base portion between the first grating portions and to make the reflection loss at the border portion contacting the base portion small.

By satisfying Expression (6), it is possible to achieve an optical performance that is equivalent to the diffractive optical element with high diffraction efficiency shown in FIG. 12.

Here, if the height of the first grating and the height of the second grating are equal and constant, the overall element structure becomes flat, so that handling and manufacture become easy, and the difference between the optical performance at the periphery and at the center can be made small.

More specifically, a periodic structure in which a second material and a third material (e.g. air) whose refractive index is different from the first and the second material are arranged alternately in a direction perpendicular to the direction in which the first grating portions are arranged, may be adopted. Then, by arranging the second and third materials alternately at a period that is smaller than the used wavelengths, it is possible to achieve the characteristics of a SWS diffractive optical element.

While preferred embodiments have been described, it is to be understood that modification and variation of the present invention may be made without departing from the spirit or scope of the following claims.

What is claimed is:

1. A diffractive optical element comprising:
   a periodic structure formed by a plurality of grating units, each grating unit comprising
   a plurality of first grating portions made of a first material, from which the width of each first grating portion and the interval between the grating portions adjacent each other differ; and
   a plurality of second grating portions made of a second material having a different refractive index than the first material that are arranged between the first grating portion;
   wherein the second grating portions are formed in portions inside the grooves between the first grating portions, and have a grating height that is less than the height of the first grating portions.

2. The diffractive optical element according to claim 1, wherein a pitch of the plurality of first grating portions is smaller than a wavelength of used light, and the period of the grating units is larger than the wavelength of the used light.

3. The diffractive optical element according to claim 1, wherein the width of the respective first grating portions changes monotonically within one period of the grating units.

4. The diffractive optical element according to claim 1, wherein, the heights of the first and second grating portions are constant.

5. The diffractive optical element according to claim 4, wherein portions between the first grating portions, other than portions where the second grating portions are formed in the grating height direction, are filled with a third material having a different refractive index than the first and the second material.

6. The diffractive optical element according to claim 5, wherein the third material is air.

7. The diffractive optical element according to claim 5, wherein
   the first grating portions are formed on a base portion made of the first material, and the refractive index of the second material is closer to the refractive index of the first material than to the refractive index of the third material; and
   wherein the second grating portions are provided in contact with the base portion.

8. The diffractive optical element according to claim 5, satisfying the following expression:

$$\{n1ieff(\lambda)-1\}\cdot(d1-d2)+\{n2ieff(\lambda)-1\}\cdot d2=\{n1(\lambda)-1\}\cdot d1i+\{n2(\lambda)-1\}\cdot d2i$$

where, i=1~s, $n1(\lambda)$ is the refractive index of the first material for incident light of the wavelength $\lambda$;

$n2(\lambda)$ is the refractive index of the second material for the incident light of the wavelength $\lambda$;

$n1ieff(\lambda)$ is the effective refractive index of the i-th first grating portion, and is $$n1ieff(\lambda)=[f1\cdot\{ni(\lambda)\}^2+(1-f1)\cdot\{n3(\lambda)\}^2]^{1/2};$$

$n2ieff(\lambda)$ is the effective refractive index of the i-th second grating portions, and is $$n2ieff(\lambda)=[fi\cdot\{n1(\lambda)\}^2+(1-fi)\cdot\{n2(\lambda)\}^2]^{1/2};$$

$n3(\lambda)$ is the refractive index of the third material for the incident light;

d1 and d2 are, respectively, the grating heights of the first and the second grating portions;

d1i and d2i are, respectively, within a diffraction optical element in which a diffraction grating made of the first material and having a step structure of s-steps in one period of a grating unit, and a diffraction grating made of the second material and having a step structure of s-steps in one period of a grating unit are layered with each other in the grating height direction, the grating heights of the i-th steps of the diffraction grating made of the first material and the diffraction gratings made of the second material; and $$fi=wi/p1$$

fi is the width wi of the i-th first grating portion divided by the pitch p1 of the first grating portions.

9. The diffractive optical element according to claim 1, wherein the height of first grating portions and the height of the second grating portions are the same and constant.

10. The diffractive optical element according to claim 1, having a periodic structure, in which the second material and a third material having a different refractive index than the first material and the second material are arranged in alternation in a direction perpendicular to the direction in which the first grating portions are arranged.

11. The diffractive optical element according to claim 10, wherein the second material and the third material are arranged in alternation at a period that is smaller than the wavelength of used light.

12. The diffractive optical element according to claim 10, wherein the third material is air.

13. The diffractive optical element according to claim 1, wherein the wavelength of used light is selected from substantially the entire wavelength region of visible light.

14. An optical system comprising the diffractive optical element according to claim 1.

15. An optical apparatus comprising an optical system according to claim 14.

* * * * *